No. 678,355. Patented July 9, 1901.
G. WINTER.
COTTON SEED PLANTER.
(Application filed May 9, 1901.)
(No Model.)
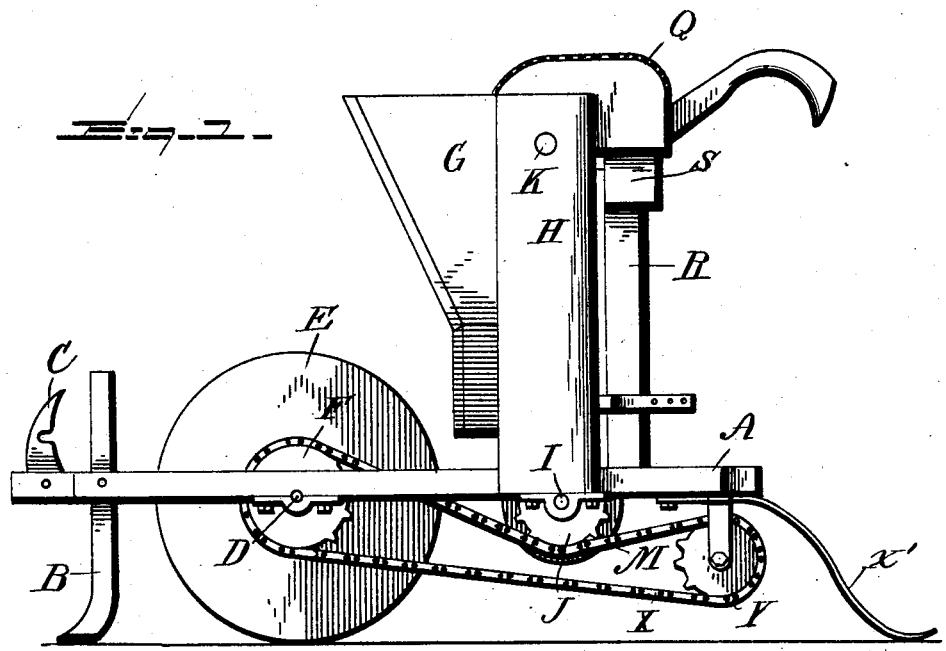
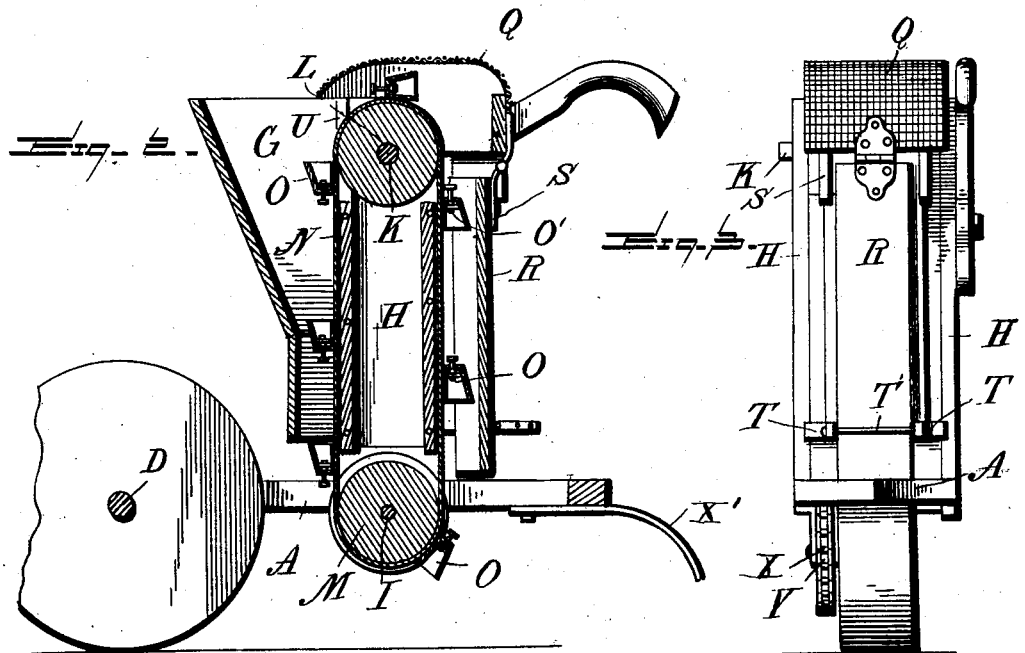
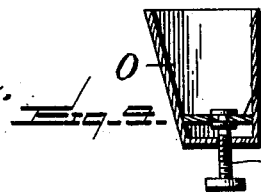
WITNESSES:
Wm. F. Doyle
A. L. Hough
INVENTOR
Gordon Winter,
By Franklin N. Hough
Attorney

United States Patent Office.

GORDON WINTER, OF McBEAN, GEORGIA, ASSIGNOR OF ONE-HALF TO B. G. WINTER, OF SAME PLACE.

COTTON-SEED PLANTER.

SPECIFICATION forming part of Letters Patent No. 678,355, dated July 9, 1901.

Application filed May 9, 1901. Serial No. 59,489. (No model.)

*To all whom it may concern:*

Be it known that I, GORDON WINTER, a citizen of the United States, residing at McBean, in the county of Richmond and State of Georgia, have invented certain new and useful Improvements in Cotton-Seed Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to cotton and other seed planters; and it consists in the provision of a planter having a hopper in which an endless carrier-belt is mounted, which carries buckets or cups having adjustable bottoms, whereby the capacity of each may be regulated, and the provision of a swinging trough vertically disposed and hinged at its upper end, while its lower end is held by means of a latch to brackets on the seed-hopper.

The invention will be hereinafter more fully described and then specifically defined in the appended claims and is illustrated in the accompanying drawings, which, with the letters of reference marked thereon, form a part of this application, and in which drawings—

Figure 1 is a side elevation of my improved seed-planter. Fig. 2 is a sectional view vertically through the hopper. Fig. 3 is a rear elevation, and Fig. 4 is an enlarged detail sectional view of one of the cups detached from the endless belt-carrier.

Reference now being had to the details of the drawings by letter, A designates the frame of the planter, which has a plow B mounted near its forward end, and C designates a clevis. In suitable bearings on said frame the axle-shaft D is journaled, and keyed to rotate with said axle is the driving-wheel E and also a sprocket-wheel F. Mounted on said frame is a seed-hopper G, which is mounted on the forward face of the casing H, in which the endless carrier is located. This carrier comprises the shaft I, which is journaled in suitable bearings on the frame of the planter, on which shaft a sprocket-wheel J is keyed. A second shaft K is mounted in bearings at the upper end of the casing, and a pulley L is mounted to rotate with said shaft K, while a similar pulley M is keyed to rotate with the shaft I, about which pulleys an endless carrier N passes. Located at suitable intervals on said carrier are the cups O, having adjustable bottoms O', to each of which is swiveled an adjusting-screw P, the shank portions of which screws are mounted in threaded apertures in the bottoms of the cups. By this provision it will be noted that the capacity of the cups may be regulated accordingly as it might be found necessary to feed a larger or a smaller quantity of seed.

Over the top of the casing is a netting Q, and to the outer margin of said netting is hinged the trough R, which is hollow, being closed on three sides. The upper end of said trough is guided between the projecting portions S of the casing, and its lower free end is normally held between the brackets T, to one of which is pivoted a latch, the free end of which engages a catch T' on the other bracket. By this means the trough may be held in position. When it is desired for any purpose to swing the trough out, it may be easily done by releasing the latch.

The front wall of the hopper is slotted, as at U, to allow the endless belt to come through into the hopper or seedbox and to elevate the seed from the box and convey it to the trough, down which it falls by gravity to the ground.

Journaled in bearings underneath the frame is a sprocket-wheel Y, over which a sprocket-chain X passes, said chain also passing over the sprocket F and in contact with the teeth of the sprocket-wheel J, whereby the carrier-operating means may be driven from the main driving-axle.

To the rear end of the frame are the coverer-shoes X', and suitable handles are secured to the opposite sides of the seedbox.

Having thus described my invention, what I claim to be new, and desire to secure by Letters Patent, is—

1. A seed-planter comprising in combination with the frame the seed-hopper, an endless carrier, a netting over said carrier, a casing for the carrier, a trough closed on three sides and hinged to the outer marginal edge of said netting, guide-pieces between which the upper end of said trough is confined, bracket-arms between which the free end of the trough swings, and a latch for holding said trough between said brackets, as set forth.

2. In combination with the seed-hopper the carrier and casing therefor, the front wall of the hopper being slotted, said carrier designed to travel in said slot, the cups secured to the carrier, the bottom of each cup being adjustable, and a screw for raising and lowering each bottom, and a hinged trough forming one wall of the casing whereby the seed is directed into a furrow as it falls from the cups, as set forth.

In testimony whereof I hereunto affix my signature in presence of two witnesses.

GORDON WINTER.

Witnesses:
W. W. McELMMY,
C. J. MIXON.